3,784,577
FATTY ACID AMIDE DERIVATIVES
Toshitsugu Fukumaru, Kyoto, Noritaka Hamma, Nishinomiya, Hiroshi Nakatani, Toyonaka, and Hideaki Fukushima and Katsuyuki Toki, Nishinomiya, Japan, assignors to Sumitomo Chemical Company, Limited, Higashi-ku, Osaka, Japan
No Drawing. Continuation-in-part of abandoned application Ser. No. 671,228, Sept. 28, 1967. This application Oct. 26, 1971, Ser. No. 192,338
Int. Cl. A61k 27/00
U.S. Cl. 260—404   3 Claims

ABSTRACT OF THE DISCLOSURE

N-substituted fatty acid amides of the formula,

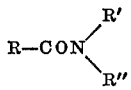

wherein R is a $C_{13}$–$C_{25}$ aliphatic hydrocarbon chain or a $C_{13}$–$C_{25}$ hydroxylated aliphatic hydrocarbon chain; R' is racemic-, d- or l-α-benzylbenzyl; R" is hydrogen, which are useful for cholesterol lowering agents, may be prepared by any of methods which produce carboxylic acid amides.

CROSS REFERENCE TO RELATED APPLICATIONS

This is a continuation-in-part of co-pending application Ser. No. 671,228, filed on Sept. 28, 1967, now abandoned.

The present invention relates to cholesterol-lowering agents. More particularly, it relates to agents which are useful for the lowering of elevated levels of cholesterol in the blood.

Atherosclerosis, which is a form of simple intimal arteriosclerosis, is an adult disease for which there is no known satisfactory cure. Although the cause of atherosclerosis is not yet known, in spite of discussions in the academic world, it has broadly been recognized that one of the most significant histopathological manifestations of atherosclerosis is the deposition of lipids in the blood. Accordingly, research has been directed to the disturbed metabolism of lipids, and attenuation has been given to the extraordinarily elevated level of cholesterol in the blood.

A number of experimental and clinical facts have been reported which indicate the relationship between atherosclerosis and elevated blood cholesterol level. Hence, the development of agents to reduce the elevated blood cholesterol level is extremely important for the prevention of atherosclerosis.

Concentrated efforts have heretofore been made for the development of such agents for lowering cholesterol and a number of compounds have been tested clinically, but none of them have proved to be completely satisfactory. Some are fairly effective but produce harmful side effects which are not negligible, and others have inadequate effectiveness, so that they require to be administered in large doses.

A group of compounds practically employed nowadays for the above purpose comprises unsaturated fatty acids, especially linoleic acid. The reason why linoleic acid is employed is because of its harmlessness to the human body. However, its effectiveness is not very high and it is uncertain and indefinite. Accordingly, large doses are required to obtain at least appreciable efficacy as a cholesterol-lowering agent.

We have found a group of compounds which are effective as cholesterol-lowering agents and are substantially non-toxic.

In accordance with this invention there is provided a cholesterol-lowering agent comprising an N-substituted fatty acid amide having the formula,

wherein R is a $C_{13}$–$C_{25}$, branched or straight, saturated or unsaturated, synthetic or natural aliphatic chain having or not having OH group. Examples of RCO are the results of following fatty acids, in the case of saturated acids, myristic acid, palmitic acid, stearic acid, isostearic acids, arachidic acid, behenic acid, lignoceric acid, cerotic acid and montanic acid; and in the case of unsaturated acids, residues of tsuzuic acid, physetoleic acid, myristoleic acid, zoomaric acid, palmitoleic acid, petroselinic acid, oleic acd, elaidic acid, vaccenic acid, gadoleic acid, erucic acid, bassidic acid, selacholeic acid, linoleic acid, linolenic acid, eleostearic acid, ricinoleic acid, parinaric acid, arachidonic acid, eicosatetraenoic acid, eicosapentaenoic acid, docosapentaenoic acid, hemp-seed oil fatty acid, linseed oil fatty acid, perilla oil fatty acid, styrax oil fatty acid, oiticica oil fatty acid, kaya oil fatty acid, walnut oil fatty acid, poppy-seed oil fatty acid, safflower oil fatty acid, watermelon-seed oil fatty acid, soybean oil fatty acid, sunflower oil fatty acid, rice bran oil fatty acid, pumpkin-seed oil fatty acid, kaoliang oil fatty acid, sesame oil fatty acid, corn oil fatty acid, rape oil fatty acid, cottonseed oil fatty acid, olive oil fatty acid, cashew oil fatty acid, tsubaki oil fatty acid, ergot oil fatty acid, castor oil fatty acid, peanut oil fatty acid, palm oil fatty acid, palm kernel oil fatty acid, coconut oil fatty acid, beef tallow fatty acid, lard fatty acid, bone oil fatty acid, horse fat fatty acid, locust oil fatty acid, crysalis oil fatty acid, shark oil fatty acid, cuttlefish oil fatty acid, sardine oil fatty acid, horse-mackerel oil fatty acid, mackerel oil fatty acid, saury pike oil fatty acid, herring oil fatty acid, saurel oil fatty acid, cod oil fatty acid, trout oil fatty acid, gray mullet oil fatty acid, tunny oil fatty acid, menuke oil fatty acid, menhaden oil fatty acid, flatfish oil fatty acid, eel oil fatty acid, various kinds of whale oil fatty acid, body oil fatty acid, skin oil fatty acid, head oil fatty acid, liver oil fatty acid, residual oil fatty acid and egg oil fatty acid and the like plant, land or marine animal oils. In addition on thereto, double bond position isomers or stereoisomers thereof may also be used.

Of the above acids, if desired, saturated fatty acid can be removed roughly from the natural fatty acids according to a suitable method such as, for example, cooling method, urea method, recrystallization method, metal salt method, distillation method and the like.

Further, in the above formula, R' is a racemic-, d- or l-α-benzylbenzyl group and R" is a hydrogen atom.

The starting amines are racemic-, d- and l-α-benzylbenzylamines which can be readily resolved according to the process disclosed in "J. Prakt. Chem." [2], 101, 297 (1921).

In the present invention, the isostearic acids signify acids having side chains such as 3-, 4-, 5- to 16-methyl-heptadecanoic acids. However, these acids and other $C_{18}$ acids having side chains should be included in the present invention. These substances are free from double bonds and hence have such advantages that they are relatively unsusceptible to oxidation.

For the production of the present N-substituted acid amides may be used any of the processes known for the preparation of acid amides.

For example, (1) a fatty acid of the formula, RCOOH is made to react directly with an amine of the formula,

in the presence or absence of such dehydrating agent as a di-substituted carbodiimide compound, p-toluenesulfonic acid or p-toluenesulfonyl chloride or the like in an aqueous or organic solvent, (2) a fatty acid of the formula,

RCOOH is converted to acid halide of the formula, RCOX, wherein X is a halogen atom (Organic Synthesis, vol. 37, p. 56) and the resulting acid chloride is brought into contact with at least an equimolar amount of the amine of the formula

in the presence of a basic condensing agent, (3) a lower alkyl ester or glyceride of a fatty acid of the formula, RCOOH is made to react directly with the amine of the formula,

in the presence or absence of a solvent and condensing agent or (4) a mixed acid anhydride of a fatty acid of the formula, RCOOH, having the formula,

wherein R''' is an alkoxy having 1 to 4 carbons, is made to react with the amine of the formula,

in the presence of a basic condensing catalyst, in the above (1) to (4) processes to R, R' and R'' are the same meanings as defined before. The processes (1) to (4) will be more fully explained below.

(1)–(a) There have already been various researches wherein dicyclohexyl carbodiimide is used in synthesizing polypeptide. But there has never been a report that an amide is synthesized by using such higher fatty acid to produce an antiatherosclerosis agent, and therefore the process of the present invention is significant. Eespecially, the process of the present invention can be said to be very advantageous because of the fact that the desired product is readily isolated by filtering and separating the urea precipitated when the reaction has been completed, without any special operation and that the said urea can be used again after being regenerated by such treatment as dehydration.

For the di-substituted carbodiimide to be used in the rocess of the present invention, there may be exemplified dicyclohexylcarbodiimide, diisopropylcarbodiimide, diphenylcarbodiimide and any other dialkyl-, dicycloalkyl- or disubstituted phenyl-carbodiimide. Any of them is equally useful in the process of the present invention.

In carrying out the process, a fatty acid, a corresponding amine and di-substituted carbodiimide, for example, are separately dissolved in an organic solvent, for example, such aromatic hydrocarbon organic solvent as benzene or toluene, such hydrocarbon solvent, as n-hexane, cycloalkane, petroleum ether or gasoline, such ether solvent as dioxane, ether or tetrahydrofuran or such alkyl halide solvent as chloroform, ethylene dichloride or carbon tetrachloride or such ester solvent as methyl, ethyl, propyl or butylacetate. These solutions are mixed at once at the room temperature or under cooling when heat generation is severe so as to be of about 1 in the mol ratio, and the mixture is stirred as required and is then allowed to stand at the room temperature for about 3 to 24 hours, whereupon the corresponding urea which is a by-product of the reaction will be precipitated. After the precipitates are filtered off, the desired product will be able to be obtained from the filtrate. Further, the excess di-substituted carbodiimide may be decomposed with acetic acid or the like as required.

The recovered urea is dehydrated and the resulting carbodiimide is usable again for the main reaction.

(b) The above-mentioned fatty acid and amine are dissolved in a suitable solvent such as, benzene, toluene, xylene, chloroform or carbon tetrachloride and the like. To the solution is added sulfuric acid, phenolsulfonic acid, p-toluenesulfonic acid, p-toluenesulfonyl chloride, or an acidic or basic ion-exchange resin, e.g. IRA-400, IR-50 or IR-120 or Amberlist 15, 21, 26 or 27 as a dehydrating agent. Subsequently, the solution is heated using a water separator to separate and remove the water generated. Thereafter, the solvent is removed and the resultant is purified, whereby a desired product can be obtained in a high yield and in a simple manner. Alternatively, the desired object of the present process may sufficiently be achieved by merely heating the solution in the presence of a dehydrating agent, using as the solvent a tertitary organic amine such as pyridine, picoline or lutidine, besides the above-mentioned solvent.

(c) Thermal dehydration process:

The aforesaid fatty acid and amine are heated at about 130°–300° C. for several hours to several ten hours, if necessary in the presence of an acid catalyst such as boric acid, whereby a desired product is obtained. In this case, water generated may be removed out of the reaction system or the reaction can be carried out in an autoclave to maintain the higher temperature.

(2) The reaction for condensing an organic amine with an acid halide is also known. However, so far as we know, there has been no report on the production of antiatherosclerosis agents by utilizing this process. We have found that, by using this process, an amide derivative which is useful as antiatherosclerosis agent can be obtained at a favorable yield under a mild monoxidative condition.

Even when an excess of such basic condensing agent as such caustic alkali as caustic lithium soda or potash, such alkaline earth hydroxide as calcium or barium hydroxide, such alkali carbonate as lithium, sodium or potassium carbonate, such alkaline earth carbonate as calcium or barium carbonate, such tertiary amine as trimethylamine, triethylamine, dimethylaniline, pyridine, picoline, anion exchange resin or an excess of the starting amine or any of the above-mentioned amines is used, the object of the invention will be able to be attained.

As for the solvent in this reaction, is used water, such organic ketone as acetone, methylethyl ketone or methylisobutyl ketone, such ester as methyl acetate, ethyl acetate, propyl acetate or butyl acetate, such other as ethyl ether, propyl ether, tetrahydrofuran or dioxane, such hydrocarbon solvent as n-hexane, cyclohexane, benzene or toluene, such alkyl halide as ethylene dichloride, chloroform or carbon tetrachloride, such tertiary amine as dimethyl formamide, pyridne or picoline or any of the starting material amines as alone or as properly mixed.

Any temperature from the freezing point up to near the boiling point of the solvent used can be applied for the reaction. Further, it is desirable that the reaction is conducted in a stream of such inert gas as nitrogen or helium.

(3)—(a) Process using glycerides:

The aforesaid oil glyceride and an equimolar amount of an amine are mixed with a basic catalyst such as, sodium methylate, sodium ethylate, potassium butylate, potassium hydroxide or sodium hydroxide and the like, or with an acidic catalyst such as ammonium chloride or boric acid and the like, and the mixture is heated at about 50°–300° C. for 30 minutes to several ten hours to obtain a desired product. Even in the absence of the basic or acidic catalyst, the desired product can be obtained in a favorable yield when the amine is used in excess. In this case, the object can be achieved either in the presence or absence of an inert organic solvent.

(b) Process using esters:

An ester of the aforesaid fatty acid or of a fatty acid mixture obtained from the aforesaid oils or fats is mixed with an amine, and the mixture is heated at about 100°–300° C. for 30 minutes to several ten hours either in the presence or absence of the above-mentioned basic or acidic catalyst and of an inert organic solvent, whereby the object of the present process can be achieved. In this case, an alcohol formed may be removed out of the reaction system or an autoclave may be used.

The reactions of both processes (a) and (b) mentioned above should be done in an inert gas such as nitrogen to inhibit the formation of peroxides, coloring matters and the like undesirable by-products.

(4) The reaction of mixed anhydride method which is carried out at a low temperature is substantially complete at a low temperature is substantially complete at about 0° C. Unsaturated fatty acid derivatives, in particular, are unstable substances which, under certain conditions undergo oxidation, polymerization, position or geometrical isomerization and the like due to heat and air. Therefore, the process for producing unsaturated fatty acid amide derivatives according to the present invention, which is a low temperature reaction, has found a great significance to attain excellent results.

The solvents employed in the present reaction include ether, dioxane, tetrahydrofuran, dichloromethane, chloroform, carbon tetrachloride, methyl acetate, ethyl acetate, benzene, toluene, xylene, acetone and methylisobutylketone. As the basic materials, organic solvent-soluble tertiary amines such as trimethylamine, triethylamine, dimethylaniline, diethylaniline and pyridine and the like are desirably used. In some cases, however, inorganic bases, such as potassium carbonate and sodium carbonate, or basic ion exchange resins may also be used.

In order to prepare said mixed acid anhydride, lower alkyl ($C_1$–$C_4$) ester of halogeno aliphatic carboxylic acid having 1 to 4 carbon atoms is reacted with a fatty acid of the formula, RCOOH wherein R is the same meanings as identified above. Examples of the said lower alkyl halogeno acid ester include chloroformate, and acetate.

The chloroformate, and acetate to be employed are methyl chloroformate, acetate, ethyl chloroformate, acetate and butyl chloroformate, acetate and the like.

The effectiveness of the compounds was tested by using mice fed on a specific diet which was enriched with cholesterol and bile acids. The blood cholesterol level of the mice had been raised to 3 to 6 times as high as the normal level. The amide compound as well was mixed with the specific diet in an amount of 0.2%, and continuously administered orally for 8 to 12 days. Then the total cholesterol value in the blood serum of the animals was evaluated. During the tests, unfavorable side effects, such as the prevention of body weight gain and others, were not observed. It is noted that the stated compound is superior to linoleic acid. Moreover, in the linoleic acid-administered group, ineffective cases were times observed due to the individual difference of the animals, and the effectiveness varied considerably even in the same individual animal. While, it should be emphasized that no such phenomena were observed in the acidamide administered group.

Another significant effect of the N-substituted acidamide compounds according to the present invention is to prevent the deposition of cholesterol and fat in the liver, which occurs in animals fed on a diet rich in cholesterol. It seems that the linoleamide compounds improve the declined lipid-metabolism function of the liver. This effectiveness is also favorable, in view of the fact that the metabolism of lipid mainly relies upon the function of the liver. In the administration of linoleic acid, such effectiveness is never observed. The results are shown in Table 1.

The extremely low toxicities of the present acidamide compounds are illustrated in Table 2, in which the acute toxicities of some of the present compounds in mice are listed.

TABLE 1

| Compound | Serum cholesterol, mg. percent | Liver cholesterol, mg./100 g. |
|---|---|---|
| Control (no compound added) | 372 | 2,600 |
| Linoleic acid | 351 | 3,124 |
| 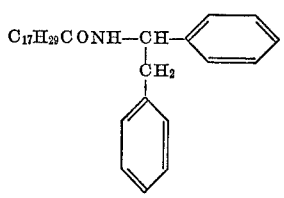 | 238 | 729 |
| 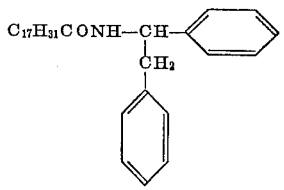 | 214 | 544 |
| 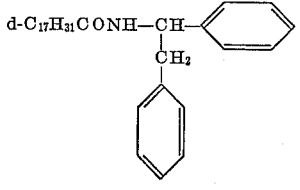 | 200 | 500 |
| 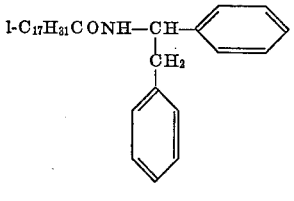 | 208 | 623 |
| 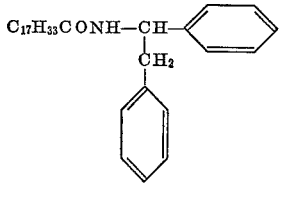 | 245 | 831 |
| 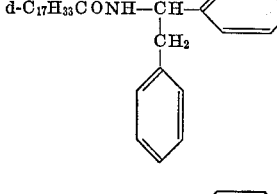 | 222 | 729 |
| 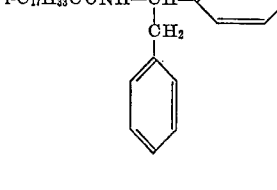 | 263 | 888 |

TABLE 1—Continued

| Compound | Serum cholesterol, mg. percent | Liver cholesterol, mg./100 g. |
|---|---|---|
| Iso-$C_{17}H_{35}$CONH—CH(—CH$_2$—C$_6$H$_5$)—C$_6$H$_5$ | 221 | 609 |
| d-Iso-$C_{17}H_{35}$CONH—CH(—CH$_2$—C$_6$H$_5$)—C$_6$H$_5$ | 209 | 561 |
| l-Iso-$C_{17}H_{35}$CONH—CO—C$_6$H$_5$ (—CH$_2$—C$_6$H$_5$) | 252 | 639 |
| Safflower oil-CONH—CH(—CH$_2$—C$_6$H$_5$)—C$_6$H$_5$ | 220 | 575 |
| d-Safflower oil-CONH—CH(—CH$_2$—C$_6$H$_5$)—C$_6$H$_5$ | 204 | 515 |
| l-Safflower oil-CONH—CH(—CH$_2$—C$_6$H$_5$)—C$_6$H$_5$ | 253 | 632 |
| Linseed oil-CONH—CH(—CH$_2$—C$_6$H$_5$)—C$_6$H$_5$ | 249 | 800 |
| Cuttlefish-oil-CONH—CH(—CH$_2$—C$_6$H$_5$)—C$_6$H$_5$ | 223 | 631 |
| Shark oil-CONH—CH(—CH$_2$—C$_6$H$_5$)—C$_6$H$_5$ | 248 | 621 |
| Sardine oil-CONH—CH(—CH$_2$—C$_6$H$_5$)—C$_6$H$_5$ | 231 | 607 |
| $C_{17}H_{29}$CONH—$\overset{d}{C}$H(—CH$_2$—C$_6$H$_5$)—C$_6$H$_5$ | 240 | 623 |
| $C_{17}H_{29}$CONH$\overset{l}{C}$H(—CH$_2$—C$_6$H$_5$)—C$_6$H$_5$ | 275 | 1,632 |
| Sardine oil-CONH$\overset{d}{C}$H(—CH$_2$—C$_6$H$_5$)—C$_6$H$_5$ | 222 | 711 |
| Sardine oil-CONH$\overset{l}{C}$H(—CH$_2$—C$_6$H$_5$)—C$_6$H$_5$ | 320 | 1,069 |

TABLE 2

| Compound | $LD_{50}$ (Mouse p.o.), g./kg. |
|---|---|
| $C_{17}H_{31}$CONHCH(—CH$_2$—C$_6$H$_5$)—C$_6$H$_5$ | >50 |
| iso—$C_{17}H_{35}$CONHCH(—CH$_2$—C$_6$H$_5$)—C$_6$H$_5$ | >50 |
| $C_{17}H_{31}$CON H$\overset{d}{C}$H(—CH$_2$—C$_6$H$_5$)—C$_6$H$_5$ | >50 |

TABLE 2—Continued

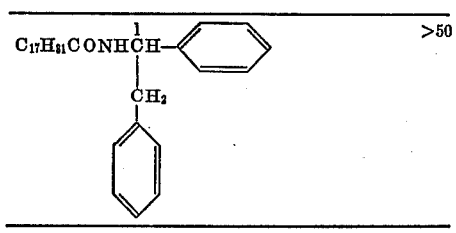

| | >50 |
|---|---|

All the products involved in the present invention are novel compounds unknown to the literature.

As is seen from Table 2, no fatal case and no significant toxic symptoms were observed even in such large doses (per os) as 0.5 g. per 10 g., namely 50 g./kg. of the body weight. Also, no significant toxic symptoms, or fatal cases, were observed when the amides in amounts of 1%, 0.5% or 0.2% in the diet were administered to mice every day for three weeks. The appetite was normal and digestive functions were unchanged. When the internal organs were inspected by dissection, there was no appreciable change.

The cholesterol-lowering agents of this invention may be orally administered. Usually the amount orally administered is 0.1 g.–20 g. per day, preferably 0.5 g.–5 g. per day and the administration may be continued for one to five months, usually for three months. The cholesterol-lowering agent may be in any suitable form which is conventional for oral administration. Thus, it may be encased in a capsule, or it may be in a liquid form, in a tablet form, or in a powder form. In preparing the agents in these various forms, the active compound may be mixed with or impregnated in a suitable solid carrier, or it may be mixed with a liquid carrier such as an edible oil, preferably those containing linoleic acid. It is also possible to use a mixture of two or more of the N-substituted amides of the invention. It may also be used as mixed with linoleic acid.

The present invention detail with reference to the following examples which are given only for illustration and not for limitation of the invention in any way.

EXAMPLE 1

To a solution of 14 g. of linoleic acid and 5.5 g. of triethylamine in 100 cc. of tetrahydrofuran was added 5.9 g. of ethyl chloroformate under stirring at $-10°$ to $-5°$ C. After addition, the stirring was continued at $-5°$ C. for additional 20 minutes. Subsequently, 9.9 g. of $d(+)\alpha$-benzyl-benzylamine was added dropwise with stirring at $-5°$ C. After the dropwise addition, the cooling bath was removed and stirring was continued until the temperature reached room temperature. Subsequently, the temperature was gradually increased, and stirring was continued at $40°$ C. for 20 minutes. After cooling, tetrahydrofuran was removed by distillation under reduced pressure, and the residue was dissolved in ether. The solution was washed with cold dilute aqueous solution of hydrochloric acid, sodium carbonate and water, and was dried over anhydrous sodium carbonate. The ether was removed by distillation to obtain 15.2 g. of a crude product. The crude product was purified by recrystallization from an ethanol-water mixture to give a pure desired product, M.P.: $45°$–$48°$ C., $[\alpha]_D^{21}$: $-7.4$ (C.=20 in $CHCl_3$).

*Elementary analysis.*—Theoretical (percent): C, 83.60; H, 9.87; N, 3.05. Analytical (percent): C, 83.76; H, 10.08; N, 3.14.

In the same manner as in Example 1, each 1 mole of fatty acids and each 1–1.1 moles of basic substances were individually dissolved in a solvent in an amount of 7 to 10 times the amount of the acid. To the solutions was added 1–1.1 moles of chloroformate dropwise under stirring at $-5°$ to $-10°$ C. After addition, the mixtures were stirred at said temperature for 10–30 minutes. Subsequently, each 1–1.1 moles of amine derivative was added dropwise under stirring to the solution. During about 10 minutes after addition, the reaction was completed essentially. In some case, if necessary, the mixtures were heated to $40°$–$50°$ C. Thereafter, the mixtures treated according to ordinary procedures to obtain in 40–85% yields such compounds as seen in Examples 2 to 31, which are shown in the following tables:

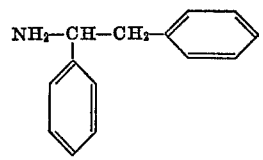

| | | | | Analysis, percent | | | | | |
|---|---|---|---|---|---|---|---|---|---|
| | | | | Calculated | | | Found | | |
| Example number | Acid moiety | Amine moiety | Properties | C | H | N | C | H | N |
| 2 | Linoleic acid | 1 (−) | M.P., 45°–48° C. | 83.60 | 9.87 | 3.05 | 83.69 | 10.04 | 3.14 |
| 3 | do | dl (±) | M.P., 45°–48° C. | 83.60 | 9.87 | 3.05 | 83.67 | 10.00 | 3.13 |
| 4 | Oleic acid | dl (±) | Waxy semi-solid | 83.24 | 10.26 | 3.03 | 83.35 | 10.32 | 3.14 |
| 5 | Isostearic acid | dl (±) | do | 82.88 | 10.65 | 3.02 | 83.04 | 10.44 | 3.18 |
| 6 | do | d (+) | do | 82.88 | 10.65 | 3.02 | 83.05 | 10.89 | 3.08 |
| 7 | do | l (−) | do | 82.88 | 10.65 | 3.02 | 83.06 | 10.67 | 3.08 |
| 8 | Linolenic acid | dl (±) | do | 83.97 | 9.47 | 3.06 | 84.12 | 9.73 | 3.22 |
| 9 | Linseed oil fatty acid | dl (±) | do | | | | | | |
| 10 | Safflower oil fatty acid | d (+) | do | | | | | | |
| 11 | do | l (−) | do | | | | | | |
| 12 | do | dl (±) | do | | | | | | |
| 13 | Soybean oil acid | dl (±) | do | | | | | | |
| 14 | Sunflower oil acid | dl (±) | do | | | | | | |
| 15 | Castor oil acid | dl (±) | do | | | | | | |
| 16 | Rape-seed oil acid | dl (±) | do | | | | | | |
| 17 | Cottonseed oil acid | dl (±) | do | | | | | | |
| 18 | Olive oil acid | dl (±) | do | | | | | | |
| 19 | Peanut oil acid | dl (±) | do | | | | | | |
| 20 | Locust oil acid | dl (±) | do | | | | | | |
| 21 | Chrysalis oil acid | dl (±) | do | | | | | | |
| 22 | Shark oil acid | dl (±) | do | | | | | | |
| 23 | Sardine oil acid | dl (±) | do | | | | | | |
| 24 | Mackerel oil acid | dl (±) | do | | | | | | |
| 25 | Herring oil acid | dl (±) | do | | | | | | |
| 26 | Saurel oil acid | dl (±) | do | | | | | | |
| 27 | Cod oil acid | dl (±) | do | | | | | | |
| 28 | Gray mullet oil acid | dl (±) | do | | | | | | |
| 29 | Menhaden oil acid | dl (±) | do | | | | | | |
| 30 | Flatfish oil acid | dl (±) | do | | | | | | |
| 31 | Residual oil acid | dl (±) | do | | | | | | |

EXAMPLE 32

A mixture of 28 g. of linoleic acid, 21 g. of α-benzyl-benzylamine, 300 ml. of toluene and 0.4 g. of p-toluenesulfonic acid was refluxed for 8 hrs. using water separator. The toluene layer was washed with acid, alkali and water, and was then dried, concentrated and purified by chromatography on an alumina column whereby 29.2 g. of a semisolid was obtained.

*Elementary analysis.*—Theoretical (percent): C, 83.60; H, 9.87; N, 3.05. Analytical (percent): C, 83.70; H, 10.08; N, 3.08.

Solvent:
  a=Toluene.
  b=Pyridine.
  c=Benzene.
  d=Chloroform.
  e=Xylene.
  f=Tetrachlorocarbon.

| Example number | Acid | Amine | Agent | Solvent | Reaction time (hr.) | Property | Calculated C | Calculated H | Calculated N | Found C | Found H | Found N |
|---|---|---|---|---|---|---|---|---|---|---|---|---|
| 33 | Linoleic acid | d (+) Amide:[α]D −176° | B | b | 20 | 45°–50° | 83.60 | 9.87 | 3.05 | 83.77 | 10.04 | 3.15 |
| 34 | do | l (−) Amide:[α]D +16.9 | E | e | 12 | 45°–50° | 83.60 | 9.87 | 3.05 | 83.79 | 10.01 | 3.14 |
| 35 | Oleic acid | dl (±) | A | c | 10 | Semisolid | 83.24 | 10.26 | 3.03 | 83.36 | 10.32 | 3.14 |
| 36 | Isostearic acid | dl (±) | A | e | 10 | do | 82.88 | 10.65 | 3.02 | 83.02 | 10.41 | 3.10 |
| 37 | do | d (+) | C | e | 10 | do | 82.88 | 10.65 | 3.02 | 83.05 | 10.87 | 3.09 |
| 38 | do | l (−) | A | a | 10 | do | 82.88 | 10.65 | 3.02 | 83.06 | 10.69 | 3.07 |
| 39 | Linolenic acid | dl (±) | A | a | 10 | do | 83.97 | 9.47 | 3.06 | 84.12 | 9.72 | 3.12 |
| 40 | Linseed oil fatty acid | dl (±) | A | a | 10 | do | | | | | | |
| 41 | Safflower oil fatty acid | d (+) | A | a | 10 | do | | | | | | |
| 42 | do | l (−) | A | a | 10 | do | | | | | | |
| 43 | do | dl (±) | F | f | 10 | do | | | | | | |
| 44 | Soybean oil acid | dl (±) | A | a | 12 | do | | | | | | |
| 45 | Sunflower oil acid | dl (±) | A | a | 12 | do | | | | | | |
| 46 | Castor oil acid | dl (±) | A | a | 12 | do | | | | | | |
| 47 | Rape-seed oil acid | dl (±) | A | a | 12 | do | | | | | | |
| 48 | Cottonseed oil acid | dl (±) | D | a | 12 | do | | | | | | |
| 49 | Olive oil acid | dl (±) | A | a | 12 | do | | | | | | |
| 50 | Peanut oil acid | dl (±) | A | a | 12 | do | | | | | | |
| 51 | Locust oil acid | dl (±) | A | a | 12 | do | | | | | | |
| 52 | Chrysalis oil acid | dl (±) | A | a | 12 | do | | | | | | |
| 53 | Shark oil acid | dl (±) | A | e | 12 | do | | | | | | |
| 54 | Sardine oil acid | dl (±) | A | a | 12 | do | | | | | | |
| 55 | Mackerel oil acid | dl (±) | A | a | 12 | do | | | | | | |
| 56 | Herring oil acid | dl (±) | A | a | 12 | do | | | | | | |
| 57 | Saurel oil acid | dl (±) | A | a | 12 | do | | | | | | |
| 58 | Cod oil acid | dl (±) | A | a | 12 | do | | | | | | |
| 59 | Gray mullet oil acid | dl (±) | A | a | 12 | do | | | | | | |
| 60 | Menhaden oil acid | dl (±) | A | a | 12 | do | | | | | | |
| 61 | Flatfish oil acid | dl (±) | A | a | 12 | do | | | | | | |
| 62 | Residual oil acid | dl (±) | A | a | 12 | do | | | | | | |

Examples 33–62 are shown in the following table, in which:

Dehydrating agent—
  A=p-Toluenesulfonic acid.
  B=p-Toluenesulfonic acid chloride.
  C=Sulfuric acid.
  D=Phenolsulfonic acid.
  E=IRA–400.
  F=Amberlist-15.

EXAMPLE 63

Linoleic acid (28 g.), 21 g. of α-benzylbenzylamine and 23.2 g. of dicyclohexyl carbodiimide were individually dissolved in 50 ml. of toluene. The solutions were mixed together in one portion, and the mixed solution was allowed to stand at room temperature for 8 hours. After filtering the solution, the filtrate was washed with acid, alkali and water, and was dried, concentrated and purified chromatographically to obtain 22.5 g. of a semi-solid, desired product.

*Elementary analysis.*—Theoretical (percent): C, 83.60; H, 9.87; N, 3.05. Analytical (percent): C, 84.01; H, 10.08; N, 3.21.

Examples 64–93 are shown in the following table:

| Example number | Acid | Amine | BN=C=NB | Solvent [α]D | Property | Calculated C | Calculated H | Calculated N | Found C | Found H | Found N |
|---|---|---|---|---|---|---|---|---|---|---|---|
| 64 | Linoleic acid | d (+) | 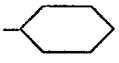 | Ether, −16.0 | 45°–50° | 83.60 | 9.87 | 3.05 | 83.80 | 10.04 | 3.15 |
| 65 | do | l (−) | Same as above | Dioxane, +16.0 | 45°–50° | 83.60 | 9.87 | 3.05 | 83.71 | 9.99 | 3.25 |
| 66 | Oleic acid | dl (±) | 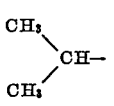 | Tetrahydrofuran | Semi-solid | 83.24 | 10.26 | 3.03 | 83.50 | 10.42 | 3.19 |
| 67 | Isostearic acid | dl (±) | 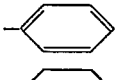 | Ether | do | 82.88 | 10.65 | 3.02 | 83.01 | 10.79 | 3.17 |
| 68 | do | d (+) | 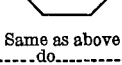 | Benzene | do | 82.88 | 10.65 | 3.02 | 83.05 | 10.79 | 3.17 |
| 69 | do | l (−) | Same as above | Toluene | do | 82.88 | 10.65 | 3.02 | 83.12 | 10.83 | 3.25 |
| 70 | Linolenic acid | dl (±) | do | do | do | 83.97 | 9.47 | 3.06 | 84.12 | 9.71 | 3.16 |
| 71 | Linseed oil | dl (±) | do | Benzene | do | | | | | | |
| 72 | Safflower oil | d (+) | do | do | do | | | | | | |
| 73 | do | l (−) | do | Toluene | do | | | | | | |
| 74 | do | dl (±) | do | do | do | | | | | | |

| Example number | Acid | B agent BN=C=NB | Solvent | Property |
|---|---|---|---|---|
| 75 | Soybean oil acid |  | Chloroform | Semi-solid. |
| 76 | Sunflower oil acid | Same as above | do | Do. |
| 77 | Castor oil acid | do | Toluene | Do. |
| 78 | Rape-seed oil acid | do | do | Do. |
| 79 | Cottonseed oil acid | do | do | Do. |
| 80 | Olive oil acid | do | do | Do. |
| 81 | Peanut oil acid | do | Benzene | Do. |
| 82 | Locust oil acid | do | do | Do. |
| 83 | Chrysalis oil acid | do | Tetrachlorocarbon | Do. |
| 84 | Shark oil acid | do | Pyridine | Do. |
| 85 | Sardine oil acid | do | Benzene | Do. |
| 86 | Mackerel oil acid | do | Ether | Do. |
| 87 | Herring oil acid | do | do | Do. |
| 88 | Saurel oil acid | do | do | Do. |
| 89 | Cod oil acid | do | Toluene | Do. |
| 90 | Gray mullet oil acid | do | do | Do. |
| 91 | Menhaden oil acid | do | do | Do. |
| 92 | Flatfish oil acid | do | do | Do. |
| 93 | Residual oil acid | do | do | Do. |

EXAMPLE 94

A mixture of 10 g. of linoleic acid and 11 g. of α-benzyl-benzylamine was heated at 180° C. for 24 hours. The reaction mixture was purified chromatographically to obtain 14.2 g. of a 45°-48° C. desired product.

*Elementary analysis.*—Theoretical (percent): C, 83.60; H, 9.87; N, 3.05. Analytical (percent): C, 83.76; H, 10.02; N, 3.30.

Examples 95–117 are shown in the following tables:

| Example number | Acid moiety | Amine | Agent | Reaction temperature, °C. | Reaction time (hr.) | Property | Analysis, percent Calculated | | | Analysis, percent Found | | |
|---|---|---|---|---|---|---|---|---|---|---|---|---|
| | | | | | | | C | H | N | C | H | N |
| 95 | Linoleic acid | d(+) | | 140 | 36 | 45°-50° | 83.60 | 9.87 | 3.05 | 83.72 | 9.98 | 3.21 |
| 96 | do | l(−) | | 140 | 36 | 45°-50° | 83.60 | 9.87 | 3.05 | 83.69 | 9.98 | 3.22 |
| 97 | Oleic acid | dl(±) | | 140 | 40 | 45°-50° | 83.24 | 10.26 | 3.03 | 83.34 | 10.41 | 3.06 |
| 98 | Isostearic acid | dl(±) | | 150 | 40 | 45°-50° | 82.88 | 10.65 | 3.02 | 83.05 | 10.77 | 3.05 |
| 99 | do | d(+) | | 150 | 40 | 45°-50° | 82.88 | 10.65 | 3.02 | 83.06 | 10.71 | 3.13 |
| 100 | do | l(−) | | 180 | 36 | 45°-50° | 82.88 | 10.65 | 3.02 | 83.00 | 10.82 | 3.09 |
| 101 | Linolenic acid | dl(±) | | 150 | 40 | 45°-50° | 83.97 | 9.47 | 3.06 | 84.12 | 9.63 | 2.99 |
| 102 | Linseed oil | dl(±) | | 150 | 40 | 45°-50° | | | | | | |
| 103 | Safflower oil | d(+) | | 180 | 40 | 45°-50° | | | | | | |
| 104 | do | l(−) | | 180 | 36 | 45°-50° | | | | | | |
| 105 | do | dl(±) | Boric acid | 180 | 16 | 45°-50° | | | | | | |

| Example number | Acid moiety | Agent | Reaction temperature, °C. | Reaction time (hr.) | Property |
|---|---|---|---|---|---|
| 106 | Soybean oil acid | | 140 | 40 | Semi-solid. |
| 107 | Sunflower oil acid | | 150 | 40 | Do. |
| 108 | Castor oil acid | Boric acid | 150 | 20 | Do. |
| 109 | Rape-seed oil acid | | 150 | 40 | Do. |
| 110 | Cottonseed oil acid | | 160 | 40 | Do. |
| 111 | Olive oil acid | | 150 | 40 | Do. |
| 112 | Peanut oil acid | | 150 | 40 | Do. |
| 113 | Chrysalis oil acid | | 150 | 40 | Do. |
| 114 | Shark oil acid | | 150 | 40 | Do. |
| 115 | Sardine oil acid | | 150 | 40 | Do. |
| 116 | Mackerel oil acid | | 150 | 40 | Do. |
| 117 | Herrng oil acid | | 150 | 40 | Do. |

EXAMPLE 118

A mixture of 10 g. of methyl linoleate and 11.2 g. of α-benzyl-benzylamine was heated in a nitrogen atmosphere at 180° C. for 50 hours removing methanol out of the reaction system. The reaction mixture was purified chromatographically to obtain 15.3 g. desired product, M.P. 46°-49° C.

*Elementary analysis.*—Theoretical (percent): C, 83.60; H, 9.87; N, 3.05. Analytical (percent): C, 83.61; H, 10.09; N, 3.25.

EXAMPLE 119

A mixture of 10 g. of methyl isostearate, 11.2 g. of α-benzyl-benzylamine and 1 g. of sodium methylate. The mixture was reacted at 150° C. for 3 hours, removing methanol during the reaction. Subsequently, the reaction product was dissolved in ether and the ether solution was washed with acid, alkali and water according to ordinary procedures and was then dried and purified chromatographically to obtain 15.8 g. of a semi-solid desired compound.

*Elementary analysis.*—Theoretical (percent): C, 82.88; H, 10.65; N, 3.02. Analytical (percent): C, 83.78; H, 10.21; N, 3.16.

EXAMPLE 120

A mixture of 10 g. of ethyl oleate, 11 g. of α-benzyl-benzylamine, 0.5 g. of sodium and 8 ml. of ethyl alcohol was heated at 160° C. for about 2 hours removing ethyl alcohol. Thereafter, the same treatments as in Example 32 were effected to obtain 14.0 g. of a desired product.

*Elementary analysis.*—Theoretical (percent): C, 83.24; H, 10.26; N, 3.03. Analytical (percent): C, 83.66; H, 9.91; N, 3.21.

EXAMPLE 121

A mixture of 10 g. of safflower oil and 11 g. of α-benzylamine was heated in an autoclave at 200° C. for 22 hours. Immediately thereafter, the same treatments as in Example 32 were effected to obtain 15.0 g. of a desired product.

Examples 122–162 are shown in the following tables:

| Example number | Acid moiety | Amine | Agent | Reaction temperature, °C. | Reaction time (hr.) | Property | Analysis, percent Calculated | | | Analysis, percent Found | | |
|---|---|---|---|---|---|---|---|---|---|---|---|---|
| | | | | | | | C | H | N | C | H | N |
| 122 | Methyl linoleate | d(+) | | 160 | 49 | 45°-50° | 83.60 | 9.87 | 3.05 | 83.72 | 10.11 | 2.94 |
| 123 | do | l(−) | | 160 | 48 | 45°-50° | 83.60 | 9.87 | 3.05 | 83.74 | 10.06 | 2.87 |
| 124 | Ethyl oleate | d(+) | | 140 | 48 | Semisolid | 83.24 | 10.26 | 3.03 | 83.34 | 10.41 | 2.90 |
| 125 | Methyl isostearate | dl(±) | NaOCH³ | 140 | 4 | do | 82.88 | 10.65 | 3.02 | 83.10 | 10.88 | 2.88 |
| 126 | do | d(+) | | 140 | 40 | do | 82.88 | 10.65 | 3.02 | 83.09 | 10.82 | 2.91 |
| 127 | do | l(−) | | 160 | 56 | do | 82.88 | 10.65 | 3.02 | 83.11 | 10.72 | 2.84 |
| 128 | Methyl linolenate | d(+) | | 180 | 50 | do | 83.97 | 9.47 | 3.06 | 84.21 | 9.63 | 2.87 |
| 129 | Linseed oil | dl(±) | | 180 | 50 | do | | | | | | |
| 130 | Safflower oil | d(+) | | 180 | 50 | do | | | | | | |
| 131 | do | l(−) | | 170 | 50 | do | | | | | | |
| 132 | Safflower oil methyl ester | d(+) | | 170 | 60 | do | | | | | | |

| Example number | Acid moiety | Agent | Reaction temperature, °C. | Reaction time (hr.) | Property |
|---|---|---|---|---|---|
| 133 | Soybean oil acid methyl ester. | Boric acid. | 160 | 50 | Semi-solid. |
| 134 | Castor oil acid methyl ester. | | 160 | 50 | Do. |
| 135 | Cottonseed oil acid methyl ester. | | 160 | 50 | Do. |
| 136 | Olive oil acid methyl ester. | | 160 | 50 | Do. |
| 137 | Peanut oil acid methyl ester. | | 140 | 50 | Do. |
| 138 | Shark oil acid methyl ester. | | 180 | 66 | Do. |
| 139 | Sardine oil acid methyl ester. | | 180 | 66 | Do. |
| 140 | Mackerel oil acid methyl ester. | | 180 | 56 | Do. |
| 141 | Herring oil acid methyl ester. | | 180 | 66 | Do. |
| 142 | Cod oil acid methyl ester. | | 200 | 65 | Do. |
| 143 | Flatfish oil acid methyl ester. | | 140 | 80 | Do. |
| 144 | Soybean oil | | 140 | 60 | Do. |
| 145 | Sunflower oil | | 140 | 60 | Do. |
| 146 | Castor oil | | 160 | 60 | Do. |
| 147 | Rape-seed oil | | 160 | 60 | Do. |
| 148 | Cottonseed oil | | 180 | 60 | Do. |
| 149 | Olive oil | | 160 | 60 | Do. |
| 150 | Peanut oil | | 160 | 60 | Do. |
| 151 | Locust oil | | 160 | 60 | Do. |
| 152 | Chrysalic oil | | 160 | 60 | Do. |
| 153 | Shark oil | | 160 | 60 | Do. |
| 154 | Sardine oil | | 160 | 60 | Semi-solid |
| 155 | Mackerel oil | | 160 | 60 | Do. |
| 156 | Herring oil | Boric acid. | 160 | 60 | Do. |
| 157 | Saurel oil | | 140 | 60 | Do. |
| 158 | Cod oil | | 140 | 60 | Do. |
| 159 | Gray mullet oil | | 140 | 50 | Do. |
| 160 | Menhaden oil | | 140 | 50 | Do. |
| 161 | Flatfish oil | | 140 | 40 | Do. |
| 162 | Residual oil | | 140 | 50 | Do. |

EXAMPLE 163

A solution of 30 g. of linoleic acid chloride in 50 ml. of anhydrous ether was added to a solution of 22.5 g. of α-benzyl-benzylamine and 8 g. of trimethylamine in 100 ml. of anhydrous ether. The reaction mixture was boiled for 2 hours after addition. Subsequently, the ether solution was washed with acid, alkali and water, and was dried, concentrated and purified chromatographically in the same manner as in Example 32 to obtain 48 g. of a desired product.

*Elementary analysis.*—Theoretical (percent): C, 83.60; H, 9.87; N, 3.05. Analytical (percent): C, 83.79; H, 10.04; N, 3.27.

Examples 164–194 are shown in the following tables:

| Example number | Acid | | Amine | Agent | Solvent | [α$_D$] | Property | Analysis, percent | | | | | |
|---|---|---|---|---|---|---|---|---|---|---|---|---|---|
| | | | | | | | | Calculated | | | Found | | |
| | | | | | | | | C | H | N | C | H | N |
| 164 | Linoleic acid | Cl | dl (±) | Triethylamine | Ether | 47°–50° | | 83.60 | 9.87 | 3.05 | 83.88 | 9.99 | 3.12 |
| 165 | do | Cl | d (+) | NaOH | Acetone, −16.6. | 47°–50° | | 83.60 | 9.87 | 3.05 | 83.79 | 9.91 | 2.88 |
| 166 | do | Cl | l (−) | Pyridine | Toluene, +17.8. | 47°–50° | | 83.60 | 9.87 | 3.05 | 83.71 | 10.21 | 2.79 |
| 167 | Oleic acid | Cl | dl (±) | do | Benzene | Semi-solid | | 83.24 | 10.26 | 3.03 | 83.51 | 10.34 | 3.00 |
| 168 | Isostearic acid | Cl | dl (±) | K$_2$CO$_3$ | MIBK | do | | 82.88 | 10.65 | 3.02 | 83.09 | 10.91 | 2.81 |
| 169 | do | Cl | d (+) | NaOH | Acetone-water | do | | 82.88 | 10.65 | 3.02 | 83.09 | 10.90 | 2.79 |
| 170 | do | Cl | l (−) | KOH | Dioxane-water | do | | 82.88 | 10.65 | 3.02 | 83.01 | 10.87 | 2.99 |
| 171 | Linolenic acid | Cl | dl (±) | Dimethylaniline | Ether | do | | 83.97 | 9.47 | 3.06 | 84.12 | 9.67 | 2.95 |
| 172 | Linseed oil | Cl | dl (±) | Triethylamine | Toluene | do | | | | | | | |
| 173 | Safflower oil | Cl | d (+) | do | do | do | | | | | | | |
| 174 | do | Cl | l (−) | do | do | do | | | | | | | |
| 175 | do | Cl | dl (±) | do | do | do | | | | | | | |

| Example number | Acid | | Agent | Solvent | Property |
|---|---|---|---|---|---|
| 176 | Soybean oil acid | Cl | Pyridine | Toluene | Semi-solid. |
| 177 | Sunflower oil acid | Cl | K$_2$CO$_3$ | MIBK | Do. |
| 178 | Castor oil acid | Cl | Dimethylaniline | Toluene | Do. |
| 179 | Rape-seed oil acid | Cl | Trimethylamine | Ether | Do. |
| 180 | Cottonseed oil acid | Cl | Pyridine | do | Do. |
| 181 | Olive oil acid | Cl | K$_2$CO$_3$ | Acetone-water | Do. |
| 182 | Peanut oil acid | Cl | NaOH | Tetrahydrofuran-water | Do. |
| 183 | Locust oil acid | Cl | KOH | Dioxane-water | Do. |
| 184 | Chrysalis oil acid | Cl | K$_2$CO$_3$ | MIBK | Do. |
| 185 | Shark oil acid | Cl | Na$_2$CO$_3$ | Acetone | Do. |
| 186 | Sardine oil acid | Cl | Triethylamine | Toluene | Do. |
| 187 | Mackerel oil acid | Cl | do | do | Do. |
| 188 | Herring oil acid | Cl | do | Ether | Do. |
| 189 | Saurel oil acid | Cl | do | do | Do. |
| 190 | Cod oil acid | Cl | do | do | Do. |
| 191 | Gray mullet oil acid | Cl | NaOH | Acetone-water | Do. |
| 192 | Menhaden oil acid | Cl | Pyridine | Ether | Do. |
| 193 | Flatfish oil acid | Cl | do | Toluene | Do. |
| 194 | Residual oil acid | Cl | do | Ether | Do. |

Following amides are also synthesized according to the above-mentioned methods.

$$C_{17}H_{33}CONHCH(C_6H_5)CH_2(C_6H_5)$$

| | Analysis, percent | | | | | |
|---|---|---|---|---|---|---|
| | Calculated | | | Found | | |
| | C | H | N | C | H | N |
| Semi-solid | 83.24 | 10.26 | 3.03 | 83.33 | 10.45 | 3.31 |

TABLE—Continued

| | | Analysis, percent | | | | | |
|---|---|---|---|---|---|---|---|
| | | Calculated | | | Found | | |
| | | C | H | N | C | H | N |
| $C_{17}H_{33}CONHCH(l)$-Ph, $CH_2$-Ph | Semi-solid | 83.24 | 10.26 | 3.03 | 83.40 | 10.39 | 2.94 |
| $C_{17}H_{29}CONHCH(d)$-Ph, $CH_2$-Ph | ...do... | 83.97 | 9.47 | 3.06 | 84.01 | 9.67 | 3.00 |
| $C_{17}H_{29}CONHCH(l)$-Ph, $CH_2$-Ph | ...do... | 83.97 | 9.47 | 3.06 | 84.13 | 9.53 | 2.99 |
| $C_{17}H_{29}CONHCH(d)$-Ph, $CH_2$-Ph | ...do... | 83.97 | 9.47 | 3.06 | 84.22 | 9.57 | 3.21 |
| Sardine oil-CONHCH(d)-Ph, $CH_2$-Ph | ...do... | | | | | | |
| Sardine oil-CONHCH(l)-Ph, $CH_2$-Ph | ...do... | | | | | | |

What is claimed is:

1. A compound of the formula, $$RCON\begin{matrix}R'\\R''\end{matrix} \quad (I)$$

wherein R is a $C_{13}$–$C_{25}$ aliphatic hydrocarbon chain or a $C_{13}$–$C_{25}$ hydroxylated aliphatic hydrocarbon chain; R' is racemic-, d- or l-α-benzylbenzyl; and R'' is hydrogen.

2. A compound of the formula, $$RCON\begin{matrix}R'\\R''\end{matrix}$$

wherein R is heptadeca-8-enyl, heptadeca-8,11-dienyl or heptadeca-8,11,14-trienyl; R' is racemic-, d- or l-α-benzylbenzyl; and R'' is hydrogen.

3. A compound of the formula, $$RCON\begin{matrix}R'\\R''\end{matrix}$$

wherein R is heptadeca-8,11-dienyl; R' is racemic-, d- or l-α-benzylbenzyl; and R'' is hydrogen.

References Cited

UNITED STATES PATENTS 3,597,458  8/1971  Nakamura et al. _____ 260—404
3,621,043  11/1971  Seki et al. _____ 260—404

OTHER REFERENCES

Bertsch et al.: C. A., 66:96497d.

LEWIS GOTTS, Primary Examiner
E. G. LOVE, Assistant Examiner

U.S. Cl. X.R.

424—320

UNITED STATES PATENT OFFICE
CERTIFICATE OF CORRECTION

Patent No. 3,784,577    Dated January 8, 1974

Inventor(s) Toshitsugu FUKUMARU et al

It is certified that error appears in the above-identified patent and that said Letters Patent are hereby corrected as shown below:

The priority data is missing and should be inserted as follows:

-- Japan, Appln. No. 35424/67 filed June 2, 1967
and
Japan, Appln. No. 47330/67 filed July 22, 1967. --

Signed and sealed this 10th day of December 1974.

(SEAL)
Attest:

McCOY M. GIBSON JR.
Attesting Officer

C. MARSHALL DANN
Commissioner of Patents